United States Patent [19]

Macano

[11] 3,934,125
[45] Jan. 20, 1976

[54] AUTOMATIC VEHICLE OPERATION SYSTEM

[75] Inventor: Samuel J. Macano, Macedon, N.Y.

[73] Assignee: General Signal Corporation, Rochester, N.Y.

[22] Filed: Sept. 28, 1973

[21] Appl. No.: 401,727

[52] U.S. Cl...... 235/150.2; 235/150.24; 246/182 B; 246/187 B
[51] Int. Cl.² ...................... G06F 15/48; B01L 3/08
[58] Field of Search....... 235/150.2, 150.24, 151.32; 246/182 R, 182 B, 182 C, 187 R, 187 B

[56] References Cited
UNITED STATES PATENTS

| | | | |
|---|---|---|---|
| 3,300,639 | 1/1967 | Bowman et al. | 246/182 B |
| 3,334,224 | 8/1967 | Allen et al. | 246/182 B X |
| 3,402,289 | 9/1968 | Burke et al. | 246/182 B X |
| 3,519,805 | 7/1970 | Thorne-Booth | 235/150.2 |
| 3,547,499 | 12/1970 | Maskery | 303/21 P |
| 3,562,515 | 2/1971 | Oster | 246/182 B |
| 3,639,754 | 2/1972 | Kovalcik et al. | 246/182 B |
| 3,655,962 | 4/1972 | Koch | 235/150.24 X |

Primary Examiner—Malcolm A. Morrison
Assistant Examiner—Jerry Smith
Attorney, Agent, or Firm—Pollock, Philpitt & Vande Sande

[57] ABSTRACT

An automatic vehicle operation system which responds to a plurality of speed commands and a plurality of stopping commands. The vehicle is controlled to travel at one of a plurality of speeds in response to one of a plurality of speed commands. The vehicle can also be controlled to stop a predetermined distance after receipt of one of the two stopping commands. Which of the two stopping commands is received determines the distance over which the vehicle travels between receipt of the stopping command and the point at which the vehicle comes to rest. Regardless of which of the commands is received the vehicle is controlled so as to respect predetermined acceleration and jerk limits during periods of acceleration and deceleration. The acceleration control circuit is responsive not only to velocity rate of change but also to the grade over which the vehicle is traveling so as to limit the total acceleration of deceleration forces to a predetermined maximum. The jerk limit control circuit is responsive to the vehicle load and limits the rate of change of tractive effort to in light of the particular loading of the vehicle so as to limit jerk to a predetermined maximum.

The receipt of a stop command initiates the operation of a digital circuit to generate a stopping pattern which controls the subsequent velocity and position of the vehicle.

14 Claims, 8 Drawing Figures

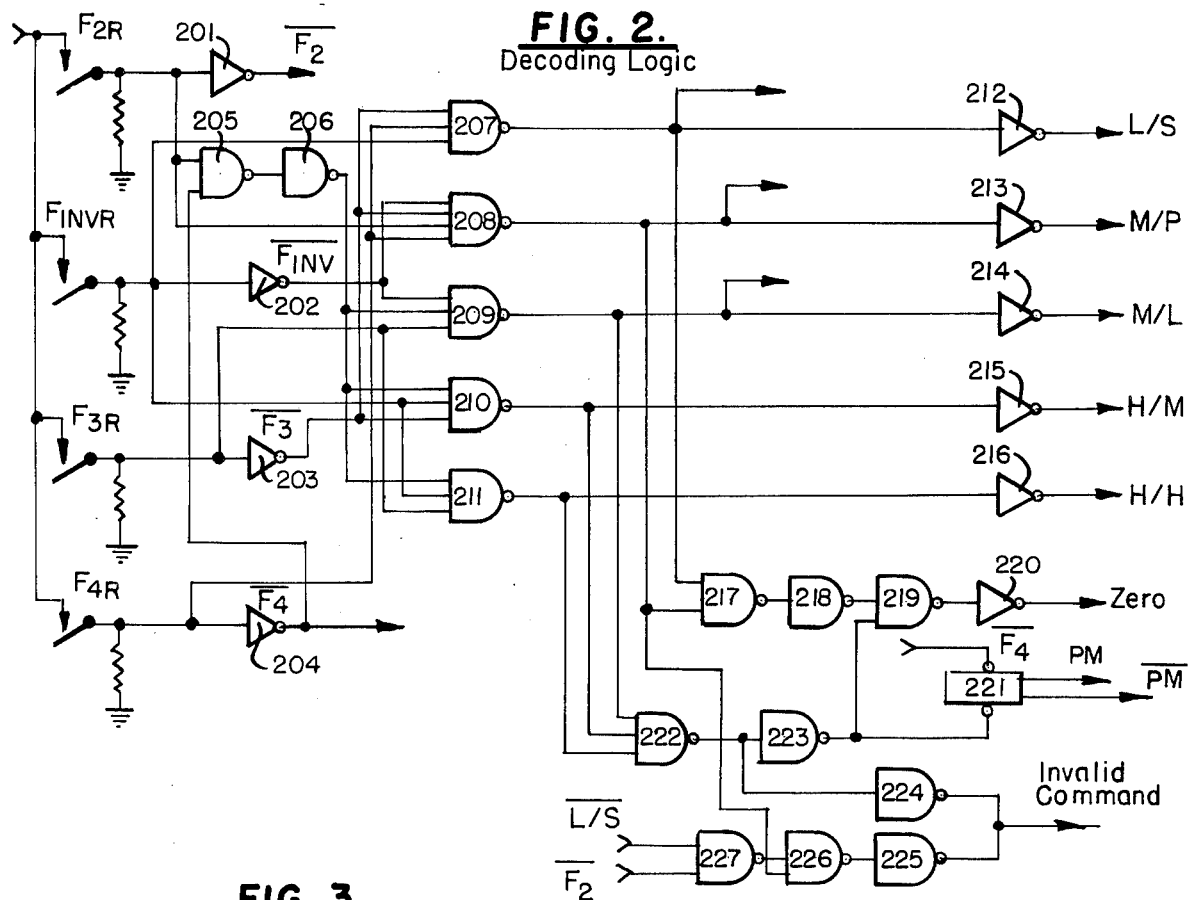
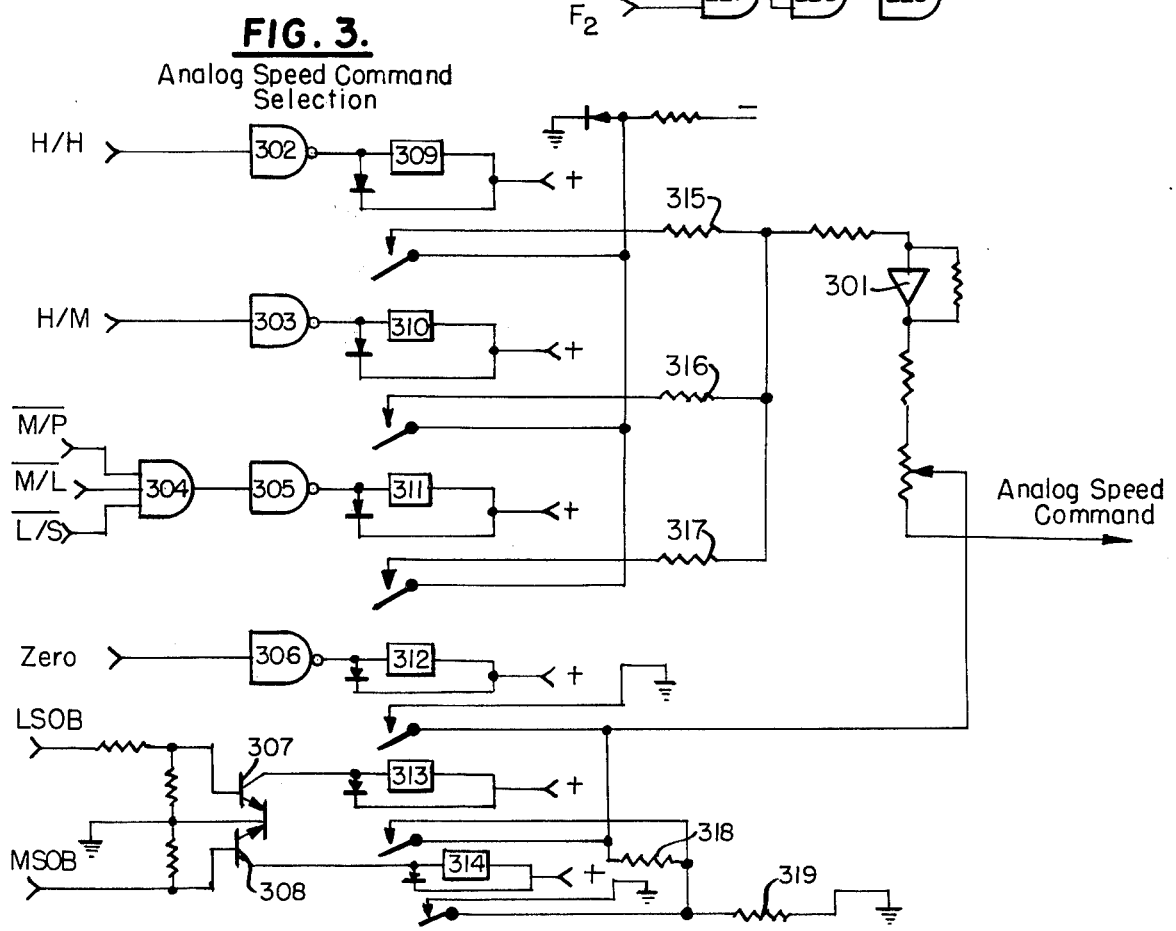

AUTOMATIC VEHICLE OPERATION SYSTEM

BACKGROUND OF THE INVENTION

Automatic vehicle operation systems which control the propulsion and braking equipment on board a vehicle to bring the actual vehicle velocity into agreement with a command velocity have been available in the art for many years. Systems of this type are particularly useful in mass transit applications which involve high speed and close headway operations of vehicles. Automatic vehicle operations in these applications eliminates the necessity for vehicle operators with the associated risk of operator error. Although failsafe systems, which limit the consequences of operator error, have been in use for an even longer period of time, these circuits do not prevent operator errors from reducing the vehicle speed to a speed below an optimum or allowable speed. Therefore, one object of the present invention is to provide an automatic vehicle operator system which eliminates the necessity for a vehicle operator.

Mass transit applications of vehicle control systems ordinarily encounter high speed and close headway vehicle operation requirements. A characterizing feature of most mass transit vehicles is their relatively light weight in comparison to long-haul vehicle operations. The associated high acceleration and speed requirement can result in large acceleration and deacceleration forces exerted upon the passengers of the vehicles. At the very least three large acceleration and deacceleration forces can cause discomfort and in some instances can even be dangerous. It is therefore another object of the present invention to provide an automatic vehicle operation system which limits the acceleration and deacceleration forces to a predetermined maximum. Since these forces can be caused by grade conditions in addition to rate of change of velocity, the acceleration control circuit takes into account not only the rate of change of velocity but also the grade over which the vehicle is traveling in order to limit the total acceleration forces to a predetermined maximum.

Jerk, which is the rate of change of acceleration, can also cause passenger discomfort and/or possibly passenger injury. Therefore, in addition to controlling the maximum acceleration forces, the maximum jerk is also controlled to be within predetermined limits. The jerk is not directly controlled. The circuit controls the maximum rate of change of tractive effort. In order to keep the jerk within predetermined limits the maximum rate of change of tractive effort is limited in light of the vehicle loading. As a result, the jerk is controlled within a predetermined maximum regardless of vehicle loading.

The vehicle is also responsive to one of two different stop commands. The difference between the two stop commands is that one stops the vehicle in a shorter distance than the other stopping command. In response to one of the two stop commands the vehicle registers the associated distance from the vehicle to the stopping point. As the vehicle proceeds toward the stopping point this distance is continuously decremented. The stopping profile generator continuously generates a signal proportional to this distance which is utilized as the command velocity for the vehicle. Thus, within the allowable acceleration and jerk limits, the vehicle comes to a smooth and precisely controlled stop.

BRIEF DESCRIPTION OF THE DRAWINGS

The invention will be explained in conjunction with the attached drawings in which:

FIG. 2 is a schematic diagram of the decoding logic;

FIG. 3 is a schematic of the analog speed command selection circuit;

DETAILED DESCRIPTION OF THE DRAWINGS

Figure 1:
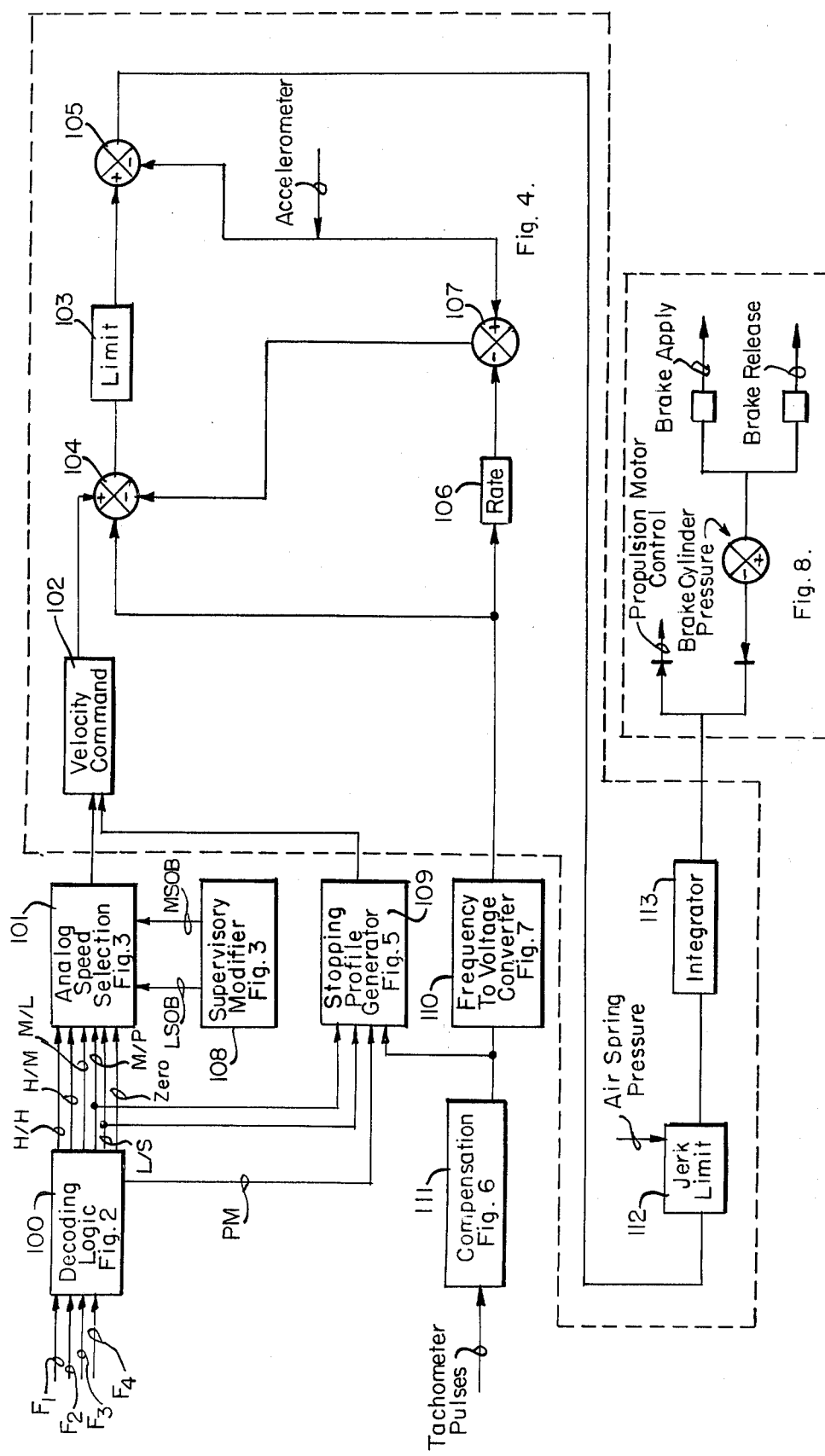
FIG. 1 is a block diagram of the automatic vehicle operation system.

FIG. 1 is a block diagram of the entire automatic vehicle operation control system. The system accepts speed information input signals F1, F2, F3, F4, and LSOB and MSOB. When properly decoded the combination of these signals selects the speed command velocity for the vehicle. An additional input are tachometer pulses which are received from a conventional toothed wheel or other equivalent device. Each pulse represents a predetermined amount of rotation of the vehicle wheels and the rate of receipt of tachometer pulses is proportional to the rate of rotation of the vehicle wheels. When properly compensated for wheel diameter variations these signals can be interpreted to determine distance traveled or vehicle velocity. The control system also receives an accelerometer input signal which is proportional to the acceleration forces exerted on the vehicle in its direction of travel. This acceleration signal is, as is well known, related to both rate of change of velocity as well as the grade over which the vehicle is traveling. Furthermore, an air spring pressure input provides a signal which is proportional to vehicle load. If the vehicle is traveling at a speed below the command speed, an output signal is provided for the propulsion motor control to increase the tractive effort of the vehicle so as to bring its velocity in agreement with the command velocity. An additional input to the control system is the brake cylinder pressure signal which is proportional to the braking effort being exerted on the vehicle. The braking effort may be increased or decreased respectively by the brake apply signal or brake release signal.

Before discussing further the control apparatus it will be helpful to first discuss the philosophy of the overall control system into which the automatic vehicle operation system is but a component. As is the case with most automatic vehicle operation systems, information is received from the wayside with respect to allowable limits. This information is received in the form of one or more of the signals F1, F2, F3, and F4. The designation F1, etc., should not be taken to mean that this signal is represented by a single frequency signal. Rather, in some cases these can be multifrequency signals. The combination of these signals which are present is interpreted in accordance with the table reproduced below:

| F1 | F2 | F3 | F4 | Limit/Command |
|----|----|----|----|---------------|
| 0  | 0  | 0  | 0  | O/O           |
| 1  | 1  | 0  | 0  | H/M           |
| 0  | 1  | 1  | 0  | M/L           |
| 1  | 1  | 1  | 0  | H/H           |
| 1  | 0  | 0  | 1  | L/S           |
| 0  | 1  | 0  | 1  | M/P           |
| 1  | 1  | 0  | 1  | L/S*          |

For each of the combinations of F1, F2, F3, and F4 which is present (indicated by a 1 in the table) the appropriate limit/command is decoded. The system in which the automatic vehicle operation system, disclosed herein, is designated to operate transmits both a speed limit a speed command to the automatic vehicle operation system. In the table above the right-hand column lists the appropriate limit/command for each of the combinations of signals F1, F2, F3, and F4 which is valid. In the limit/command column the first letter represents the speed limit and the letter following the slash represents the speed command. Thus, the combination 1100 represents a high speed limit with a medium speed command (hereinafter designated H/M). The control system disclosed herein would control a train receiving this combination of input signals to a medium speed; and anything below a high speed would not be considered an over speed condition such as to cause the application of emergency braking. In a like manner the combination 0110 represents a medium speed limit with a low speed command (M/L) and a combination 1110 represents a high speed limit with a high speed command (H/H). The next two combinations L/S and M/P are stopping commands. The first, represented by 1001, is a low stop which, when received by a vehicle proceeding at a low speed, will stop the vehicle in a predetermined distance. The other stopping command 1010 will stop a vehicle receiving it while traveling at a medium speed in a somewhat longer predetermined distance.

It will be noticed that for the vehicle to proceed one or the other of the signals F1 and F2 must be received. The absence of both of these signals results in a zero speed limit and a zero speed command. These signals, that is F1 and F2, are considered vital signals which must be received on the vehicle for it to proceed. In practice each of these signals can be a complex combination of two frequencies, one of which is on and the other of which is off at all times. The decoding apparatus checks to see that the signal is indeed of this character before it determines that the signal has been received. In contrast, the signals F3 and F4 may be single frequency signals which can simply be decoded. The complex decoding of the signals F1 and F2 necessitates the use of the last combination, that is the L/S* combination. Under control conditions a vehicle which undergoes a transition from a M/L command to a L/S command would first receive 0110 and then receive a 1001. It will be apparent that there are two changes in this combination. The first is that the signal F4, which is not present in the M/L input, is present in the L/S input. The decoding of this signal presents no problem. However, the second change is in F2 which is present in the M/L input but which is absent in the L/S input. In order to precisely control the stopping position of the vehicle, the stopping operation must be initiated immediately upon receipt of the stopping command. However, the decoding circuits necessary to check for the presence or absence of F1 and/or F2 require an appreciable time (approximately ½ second) to operate. Therefore, in order to initiate the stopping operation as soon as possible, the last command, that is L/S*, is considered valid for one second. If, after receipt of this command for one second, the 1101 has not changed to a 1001, it is considered an invalid command. However, prior to the expiration of that one second it is considered a valid stopping command.

Any combination other than that shown in the table above is considered an invalid signal and is not operative to control the vehicle.

Therefore the decoding logic 100 receives as an input a combination of the signals F1, F2, F3, and F4 and produces one of the output signals H/H, H/M, M/L, M/P, L/S or O which is provided as an input to the analog speed selection circuit 101. A further input to the analog speed selection network 101 comes from the supervisory modifier circuit 108. This circuit provides up to two bits of information to the analog speed selection circuit 101 if the information is received on board the vehicle. Either the LSOB (least significant override bit), the MSOB (most significant bit), neither of them, or both of them, can be present. In the absence of these signals the analog speed selection network 101 is controlled solely from the decoding logic circuit 100. The presence of LSOB or MSOB modifies the analog speed command signal as will be explained below. The presence of both these signals causes a 0 speed command to be selected by the analog speed selection circuit 101. The presence of LSOB, alone, reduces the speed command by a predetermined percentage while the presence of MSOB, alone, reduces the speed command by a larger percentage. The analog speed selection network 101, in response to the presence and absence of its various input signals, selects a provisional analog input signal to the velocity command network 102. In the absence of an input from the stopping profile generator 109 the velocity command circuit 102 merely passes this signal on to the acceleration and jerk limiting circuitry.

The automatic vehicle operation system also receives tachometer pulses from a conventional tachometer generator on board the vehicle. These pulses are then compensated, if necessary, in the compensation circuit 111. The output of compensation circuit 111 is a series of pulses each of which represents a predetermined amount of travel of the vehicle. This pulse train is applied to the stopping profile generator 109 for reasons which will appear hereinafter. The same pulse train is applied to the frequency-to-voltage converter 110 which produces an output voltage proportional to the frequency of tachometer pulses. This voltage is then proportional to the actual velocity of the vehicle.

Velocity command circuit 102 provides the selected velocity command to summing amplifier 104. A further input to summing amplifier 104 is a signal proportional to actual vehicle velocity from the frequency voltage converter 110. A third input to summing amplifier 104 comes from summing amplifier 107.

One input to the summing amplifier 107 is an accelerometer signal which is proportional to the total acceleration forces on the vehicle. This signal has two components, one related to grade and the other related to rate of change of velocity. A second input to summing amplifier 107 is provided by the rate circuit 106. The input to rate circuit 106 is the signal proportional to actual vehicle velocity, supplied by the frequency to voltage converter 110. Thus, the output of summing amplifier 107 is a signal proportional to the acceleration forces due to the grade of the terrain upon which the vehicle is traveling. This is a third signal provided to summing amplifier 104. The output of summing amplifier 104 is a velocity error signal which is provided to limiting circuit 103. Limiting circuit 103 has a linear relationship between output and input between the predetermined acceleration limits. Above and below these limits the limiting circuit 103 saturates and provides a constant signal equal to the allowable acceleration. The output of limiting circuit 103 is provided to summing amplifier 105. A second input to summing amplifier 105 is the accelerometer signal which is identical to the accelerometer input signal to summing amplifier 107. The output of summing amplifier 105 is a signal proportional to the required change in tractive effort to bring the actual vehicle velocity in line with the command velocity within allowable acceleration limits.

A more complete understanding of the interaction of circuits 102–107 can be obtained by considering two distinct cases. In the first case, the limiting circuit 103 operates to limit the output of the circuit to something below its input. In this case, the output of summing amplifier 105 is equal to the difference between the allowable acceleration of the vehicle and the acceleration forces being exerted on the vehicle by the existing level of tractive effort. Thus, the signal is equal to the allowable change in tractive effort that is available.

When the limiting circuit 103 is not in its saturated state, then the input to summing amplifier 105 is a linear combination of the velocity error at the tractive effort then existent. The grade information which is included in the accelerometer signal provided as one input to summing amplifier 105 balances out the grade information which passed through summing amplifier 104. The result is, therefore, the allowable change in tractive effort required to increase the vehicle velocity to its command velocity.

The output of summing amplifier 105 is provided to jerk limit circuit 112. To limit the jerk this circuit limits the rate of change of tractive effort in proportion to vehicle load. The vehicles are supported by air springs and as a result the air spring pressure is proportional to vehicle load. Therefore, the command input to the jerk limit circuit 112 is the air spring pressure. Jerk is rate of change of acceleration which is equal to $$\frac{df}{dt} \cdot \frac{1}{m},$$

where df/dt is rate of change of tractive effort. The limiting circuit limits df/dt to be less than k·m, where k is the jerk limit and m is the vehicle load.

The output of the jerk limit circuit 112 is fed through an integrator to provide a resultant signal which is indicative of the required change in tractive effort of the vehicle in order to reach the command velocity. In this sense the term "tractive effort" is generic to both acceleration and deceleration. If the signal is positive, it is fed to the propulsion motor control system in order to control the propulsion system and to therefore control the velocity of the vehicle. If the signal is negative it is then compared with the existing brake cylinder pressure and if a change in braking force is desired, that change is communicated to the braking system through either the brake apply magnet valve or the brake release magnet valve, as required.

The stopping profile generator 109 provides a second provisional command velocity to velocity command circuit 102. This velocity command circuit 102 selects the lower of the two provisional velocity commands provided to it. The manner in which the stopping profile generator provides a provisional velocity command will now be explained.

Reference to the table above will show that a stopping command is indicated by the presence of the signal F4. This signal produces the PM output from the decoding logic 100. This indicates to the stopping profile generator 109 that a stopping pattern has been initiated. When one of the two signals M/P or L/S is available, it too is provided to the stopping profile generator 109 so as to select a distance over which the vehicle will stop. This distance is registered and decremented by the compensated tachometer pulses fed to the stopping profile generator 105 from the compensation circuit 111. Therefore, the output of the stopping profile generator is, at any instant of time, a voltage which is proportional to the distance the vehicle has to go to the stopping point. The velocity command circuit interprets this voltage as a provisional velocity command. In the early stages of a stopping profile this voltage may be above the low command speed voltage provided by analog speed selection network 101. The velocity command circuit 102 chooses the lower of the two provisional velocity commands, that is the velocity command from analog speed selection circuit 101 and the velocity command from stopping profile generator 109. This chosen velocity command then acts with the remaining portions of the control system to control the propulsion motors and brakes of the vehicle to bring it to a smooth precise stop at the stopping point.

Before discussing the remaining figures of the drawings which show the circuit schematics of the various functional blocks illustrated in FIG. 1, a word is in order about the components not shown in FIG. 1.

In the apparatus shown in FIG. 1, that is the automatic vehicle operation system, controls the propulsion motors and braking apparatus of the vehicle so as to bring the velocity into correspondence with the command portion of the signal received from the wayside. The speed limit portion of the signal is not utilized by the automatic vehicle operation system whatsoever. A frequency responsive speed governor, not shown in FIG. 1, comprises the vehicle velocity with the speed limit portion of the wayside signal. If the vehicle ever does exceed the speed limit then an emergency brake application is initiated by the frequency responsive governor. One such governor is illustrated in copending application Ser. No. 395,674, filed Sept. 10, 1973 now U.S. Pat. No. 3,886,420 and assigned to the assignee of this application.

FIG. 2 illustrates the decoding logic circuit 100 (shown in FIG. 1). This circuit receives as an input a combination of the signals F1, F2, F3 and F4. For convenience these inputs are shown in FIG. 2 in the form of relay contacts F2R, F1NVR, F3R, and F4R. As has been referred to previously, the F2 signal, and thus picking contact F2R, may take an appreciable amount of time after the signal is received. The designation of F1NVR refers to F1 non-vital. This signal is decoded in a simple fashion (for the automatic vehicle operation system) and is thus available more quickly. These signals can be transmitted to the vehicle from the way side in a variety of manners and also decoded in a variety of manners.

A positive source of energy is connected to one of each of these relay contacts and when the relay is energized, that is when the associated signal is received and decoded, the transfer contact is pulled up and the source of energy is coupled to one of the inverters 201, 202, 203, and 204, respectively, for the signals F2, F1NV, and F3 and F4. Thus, for example, when the signal F2 is received the relay contact F2R is pulled up providing an input source of energy to converter 201 to provide a low output signal indicating the absence of $\overline{F2}$ or correspondingly the presence of F2. One Nand gate 207 receives as inputs FINV, $\overline{F3}$ and F4. Reference to the decoding logic table on page 5 shows that the signal L/S is made up of 1001. The output gate 207, therefore, negated by inverter 212 provides the L/S signal. Nand gate 208 receives as input signal $\overline{FINV}$, F2, $\overline{F3}$, and F4. Therefore, it receives the signals 0101. When negated by inverter 213 this produces the M/P signal. Nand gate 205 receives F2 and $\overline{F4}$. The output of Nand gate 206 is then F2·$\overline{F4}$ which is provided as an input to Nand gates 209, 210, and 211. Nand gate also receives $\overline{FINV}$ and F3. Thus, the output signal of Nand gate 209 when negated by inverter 214 produces the M/L signal.

Nand gate 210 receives in addition to the output of Nand gate 206, FINV and $\overline{F3}$ and, its output signal, when negated by inverter 215 produces the H/M signal.

Nand gate 211 is provided with FINV in addition to F3 and the output of Nand gate 206. When the output of Nand gate 211 is negated by inverter 216 it produces the H/H. These logical functions can be verified by the reference to the table on page 5. Nand gate 217 receives the inputs $\overline{L/S}$ and $\overline{M/P}$ and therefore the output of Nand gate 218 is $\overline{L/S·M/P}$ which is provided as one input to Nand gate 219. The other input to Nand gate 219 is provided by Nand gate 223. The input to Nand 223 comes from Nand gate 222 in turn whose inputs are $\overline{M/L}$, $\overline{H/M}$, and $\overline{H/H}$. Thus, Nand gate 219 can only be satisfied by the code combination 0000 or some other invalid code combination. This signal negated by inverter 20 produces a zero speed command signal.

The output of Nand gate 223 is $\overline{H/H}$ · $\overline{H/M}$ · $\overline{M/L}$. When the output of Nand gate 223 is high and $\overline{F4}$ is low, flip-flop 221 is set which results in PM being high. This action can only take place when either M/P or L/S is being received. Either of these conditions is a profile mode, that is, the stopping profile generator 109 is to be initiated. Therefore, this signal initiates operation of that circuit indicating that one of the two stops is to be made.

An invalid command logic is also provided by the wired "or" circuit combination of Nand gates 224 and 225. If both of these gates are high an invalid command has been received. Nand gate 224 can only be high if its input is low which means that H/H, H/M, and M/L have not been received. Nand gate 225 can only be high if neither of the stopping commands has been received. The resulting logic issues an invalid command since none of the valid commands have been received.

Thus, the decoding logic 100 shown in more detail in FIG. 2 produces from the combination of four input signals the output signals H/H or H/M or M/L or M/P or L/S or zero in addition to the PM signal, when proper.

The analog speed selection circuit 101 is shown in more detail in FIG. 3. This circuit receives as inputs the six possible commands from the decoding logic circuit 100 and also the modifier bits LSOB and MSOB, when present. The analog speed command selection circuit 101 shown in FIG. 3 controls the analog speed command output in relationship to the signals received from the decoding logic netword 100. When a high speed command is received, for instance, relay 309 is energized to insert resistor 315 in the input circuit for operational amplifier 301. On the other hand, of a medium speed command is received, relay 310 is picked up to insert resistor 316 in the input circuit of operational amplifier 301. The variation in input resistance results in a variation in output voltage corresponding to high or medium speed command. If any of the M/P, M/L, or L/S signals are received relay 311 is picked to insert resistor in the input circuit of operational amplifier 301. Resistor 317 corresponds to a low speed command for the vehicle. The zero speed command, when present, causes relay 312 to pick up grounding the output of operational amplifier 301. As a result, a zero output voltage is provided for a zero speed command. Receipt of modifier LSOB causes conduction of transistor 307 which results in relay 313 being energized. Energization of relay 313 reduces the output resistance of the operational amplifier reducing its output voltage. If MSOB is received, this energizes transistor 308 which causes relay 314 to become energized. This, in turn, shorts out resistor 319 in the output resistance of the operational amplifier also reducing its output voltage. Resistor 319 can be chosen to be greater in value than 318 such that receipt of MSOB reduces the output voltage of the operational amplifier 301 by a greater amount than receipt of LSOB. As a result, the resultant speed command will be lower when MSOB is received than when LSOB is received. Receipt of both LSOB and MSOB shorts out both resistors 318 and 319 in the operational amplifier output circuit effectively grounding this circuit and reducing the output voltage to zero. Thus, receipt of LSOB and MSOB is equivalent to a zero speed command.

Figure 4:
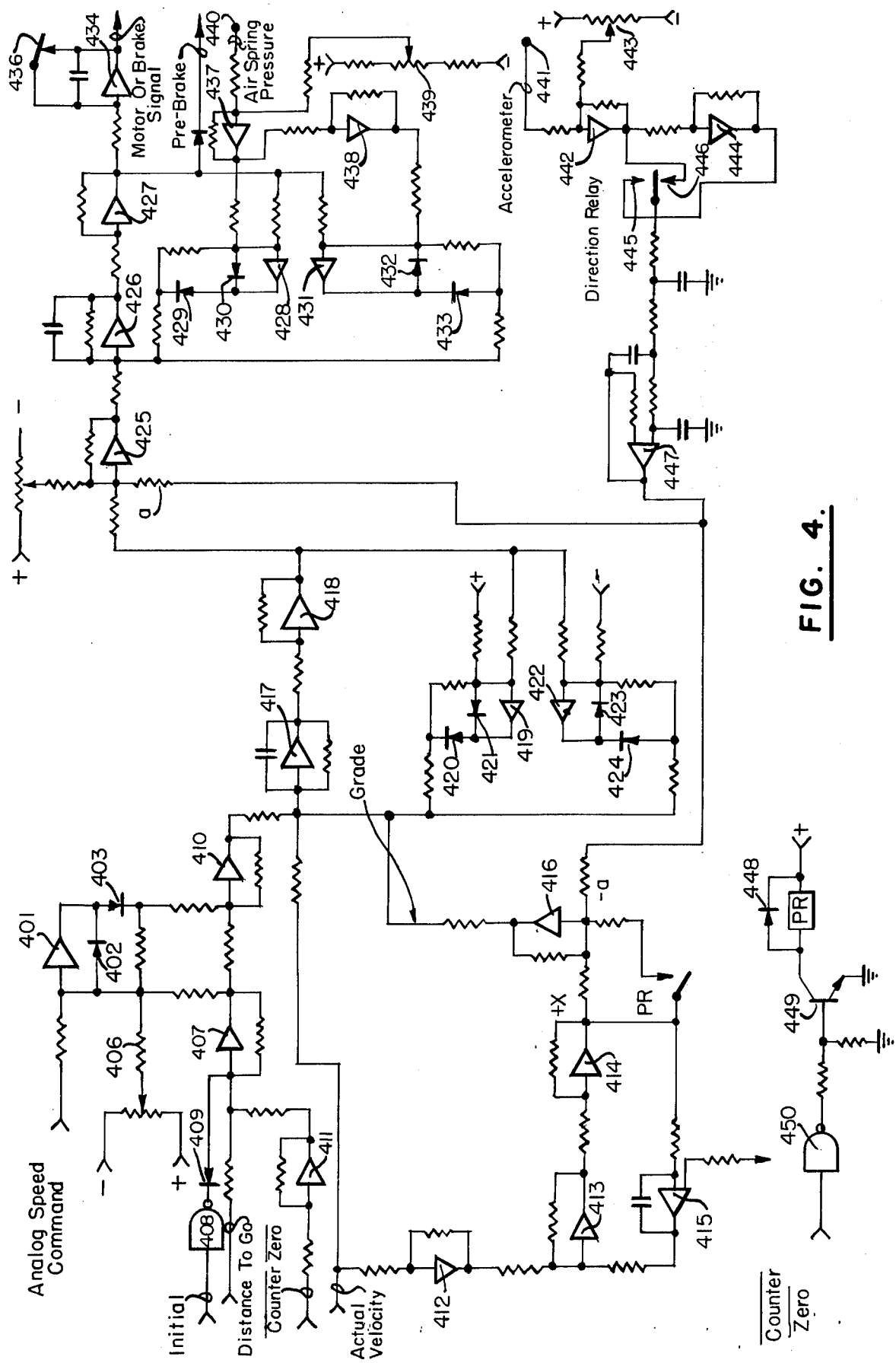
FIG. 4 is a schematic of a control circuit for converting analog speed commands into propulsion and braking equipment control signals.
Figure 5:
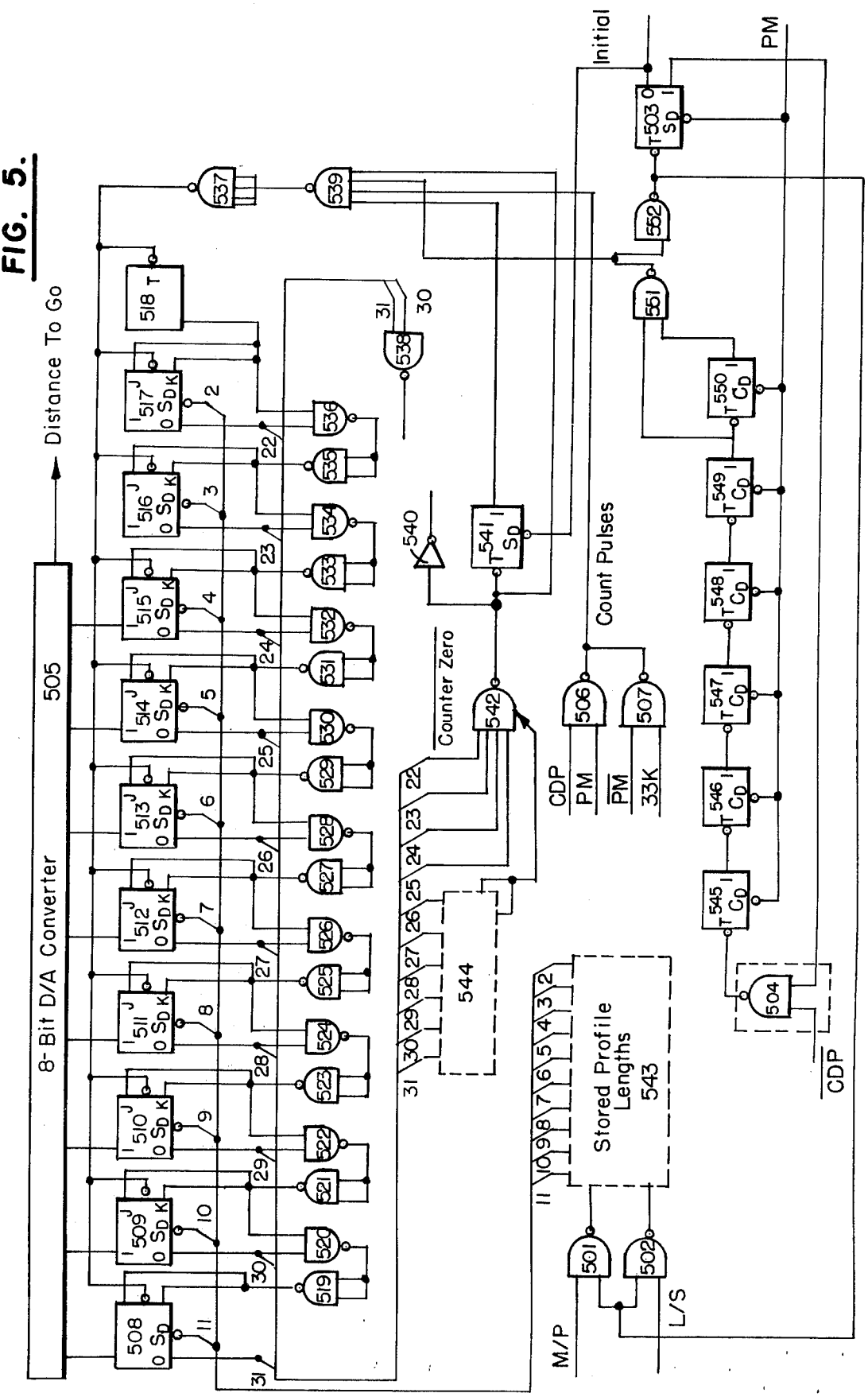
FIG. 5 is a schematic of the stopping profile generator.
Figure 6:
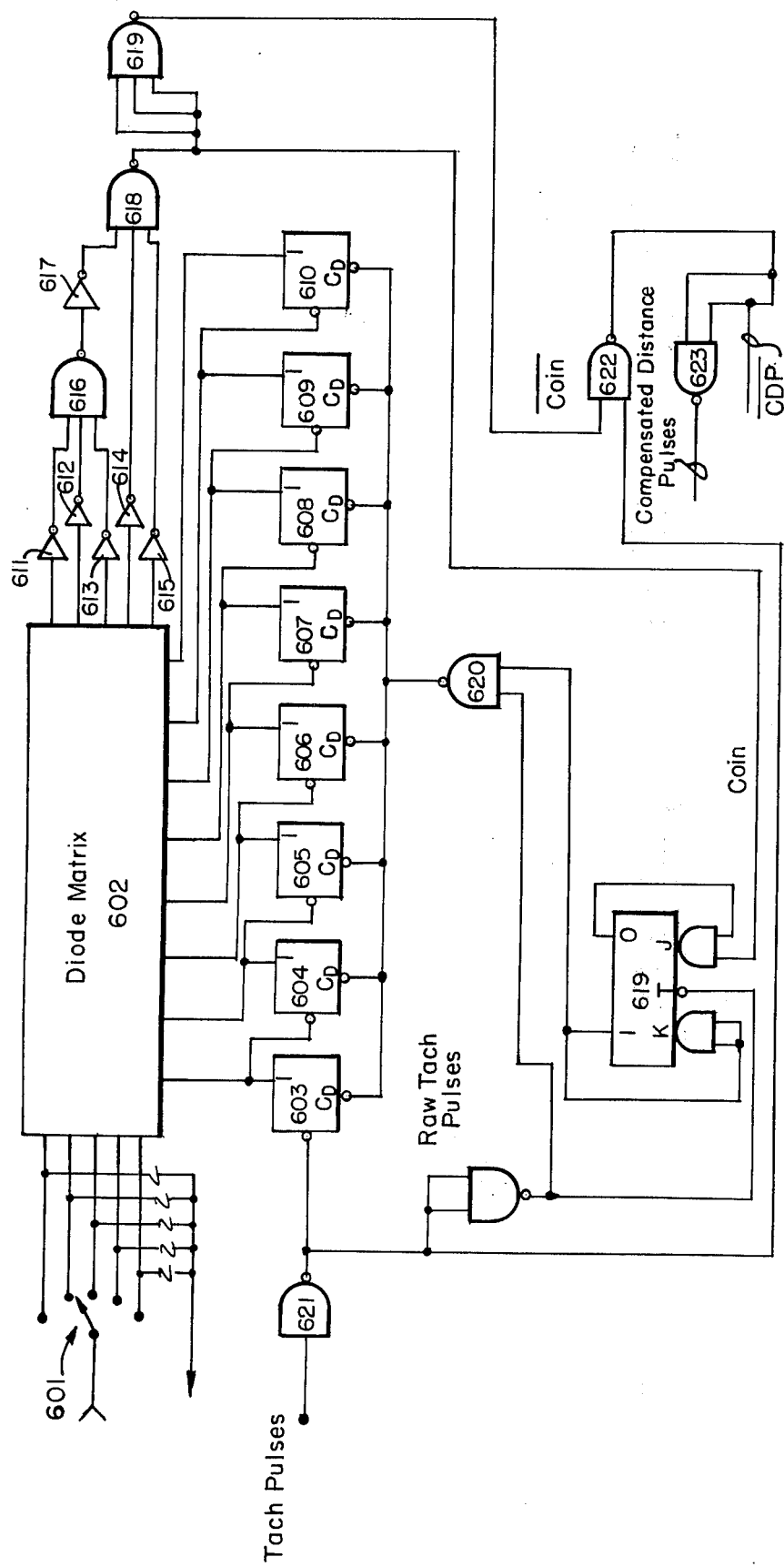
FIG. 6 is a schematic of a compensation circuit.
Figure 7:
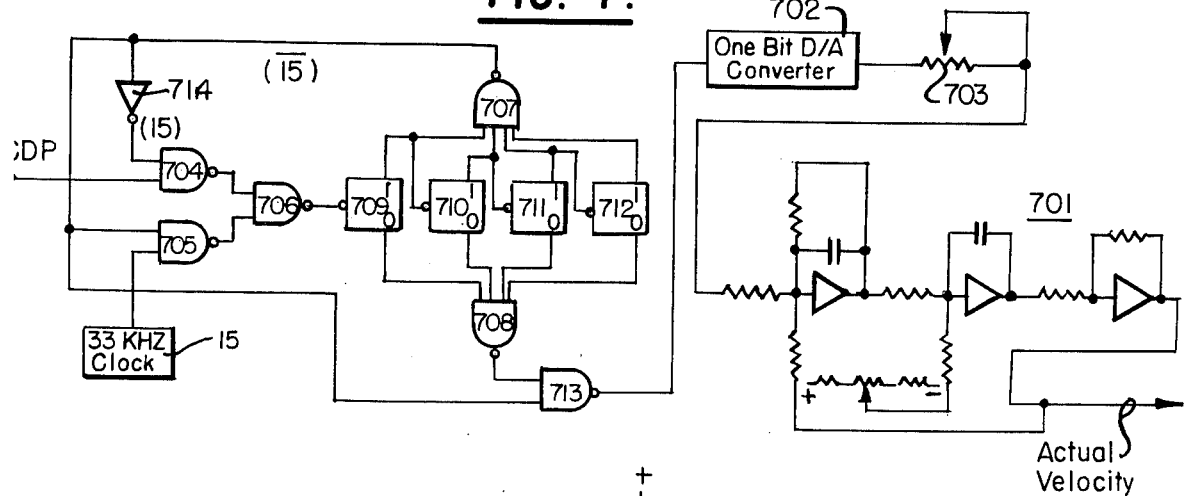
FIG. 7 is a schematic of a digital analog converter.

Before discussing FIGS. 4 and 5, it will be helpful to first discuss FIGS. 6 and 7 to show the manner in which wheel diameter variations are compensated for and the manner in which the frequency to voltage converter 110 operates.

Since the automatic vehicle operation system disclosed herein is capable of being used with pneumatic tired vehicles, the possibility of variations in tire diameter exists. Conventional tachometer pulse generators produce pulses in response to rotation. If tire diameter varies this will result in variation in the number of pulses per unit distance traveled. Since the stopping profile generator 109 must have an input in which pulses accurately represent distance, compensation circuit 111 is utilized to provide this compensation. There are a number of reasons which cause variations in tire diameter, some of which are actual tire wear, variations in tire diameter due to variations in inflation pressure, etc. The compensation circuit 111 enables the necessary compensation to be determined experimentally. A multi-position switch 601 controls the state of a diode matrix 602. A second input to the diode matrix 602 comes from each of the flip-flops 603-610 which forms an eight-stage counter. Depending upon the selected condition of diode matrix 602 and the state of the flip-flops 603-610 one or more of a plurality of inverters 611 through 615 and 617 and the plurality of gates 616 and 618 will be enabled. Enabling gate 618 enables flip-flop 619 so that on the next tachometer pulse gate 620 will cause the counter to reset. As tachometer pulses are received through gate 621 they enable gate 622. So long as gate 618 and gate 619 are not enabled, gate 622 can pass these tachometer pulses through gate 623 through the output of the compensation circuit 111. However, when the gates 618 and 619 are enabled the next tachometer pulse cannot pass gate 622. However, this next tachometer pulse causes the counter to reset and begin the cycle again. Therefore, for instance, in position 1 the diode matrix 602 causes 128 pulses to require gate 618 to be enabled. Therefore, the compensation circuit 111 will pass these 128 pulses. However, the next pulse, the 129th pulse will not be passed. As a result, when the multi-position switch 601 is in its first position, every 129th pulse will be omitted from the output of the compensation circuit 111. In position 2 of switch 601, 74 pulses will be passed before eliminating one; in position 3, 51 pulses will be passed before eliminating one; in position 4, 39 pulses will be passed before eliminating one and in the 5th position, 32 pulses will be passed before eliminating one. In this manner, the output of gate 623 can be adjusted so that each of the tachometer pulses is related to a predetermined unit distance regardless of tire diameter variations.

FIG. 7 illustrates the schematic for frequency to voltage converter 110. The input to this circuit is the compensated distance pulses from compensator 111. This input is provided as one input to Nand gate 704. Before describing the operation of this circuit in some detail, its necessity will be explained. The tachometer pulses or the compensated distance pulses provided as an input to this circuit have an approximately 50% duty cycle. The integrator 701 is provided to produce an output signal whose DC level is proportional to the frequency of the pulses. However, the approximately 50% duty cycle of these pulses would negate the effectiveness of the integrator 701 to produce an analog DC velocity proportional to pulse repetition rate. Therefore, the distance pulses provided by compensation circuit 111 must be reduced to a standard width such that the integrator 701 will produce a DC voltage proportional to the pulse repetition rate. To this effect a 33 kilohertz clock 15 is provided for retiming the distance pulses to pulses of a standard width. In order to do this a counter comprising flip-flop stages 709 through 712 is provided. A gate 707 provides a $\overline{15}$ signal, that is a signal which is high when the counter is not full and a gate 708 provides a high signal whenever the counter is not zero. The outputs of gates 707 and 708 are fed to gate 713 which provides a low signal to the converter 702 during the period when the counter is counting.

Assuming there is no distance pulse, that is, one input to gate 704 is low and that the counter is in some intermediate state, the other input to gate 704 would also be low producing a high input to gate 706. Of course the clock input to gate 705 will change at a 33 kilohertz rate. The other input to gate 705 will be high since the counter is not full. Thus, one input to gate 706 is high and the other alternates between low and high and as a result the counter counts up to 15. When the counter reaches 15 inverter 714 produces a high input to gate 704 and gate 704 continues to produce a high output due to the absence of the distance pulse. However, the non-clock input to gate 705 now goes low since the counter is full. Thus, gate 705 produces a high output regardless of the clock and gate 706 produces a low output. In this condition, the counter ceases to count.

When a distance pulse arrives, it provides a second high input to gate 704 which produces a low output causing the output of gate 706 to go high making the count in the counter zero. As a result, the non-clocked input to gate 705 now goes high again and the output of gate 705 switches back and forth at the clocking rate. The output of gate 704 goes high in response to the low input from inverter 714. As a result, the counter again begins counting. The point in time when the distance pulse ceases has no effect upon the operation of the circuit. The counter continues to count up 15 just as it did before. During the period of time that the counter is counting between zero and 15, the output of gates 707 and 708 are high producing a low output from gate 713. The width of this low output from gate 713 is equal to the period of 15 clockpulses. Thus, the leading edge of each of the distance pulses is converted to a pulses from gate 713 of predetermined width.

This predetermined width pulse is inverted to a constant level by the converter 702. Potentiometer 703 provides a level setting device for adjusting a level of the input to the integrator or low pass filter 701. The output of filter 701 is a DC level which is proportional to the repetition rate of the pulses produced by gate 713 which is in turn related to the repetition rate of the distance pulses. Therefore, this DC level is proportional to vehicle velocity.

FIG. 5 is a schematic of the stopping profile generator 109 (shown in FIG. 1). This circuit receives as inputs the signals M/P at gate 501 and L/S at gate 502, both from the decoding logic circuit 100. In addition, the circuit receives the input signal PM at flip-flop 503 also from the decoding logic 100. Another input signal to this circuit is the compensated distance pulses negated ($\overline{CDP}$) the signals provided by the compensation circuit 111, and in particular by the output of gate 622 (see FIG. 6). This input is directed to gate 504 (FIG. 5). Additional inputs are the PM and $\overline{PM}$ signals applied to gates 506 and 507, respectively, as well as CDP (compensated distance pulse) applied to gate 506 and the 33 khz clock applied to gate 507. The main output from the starting profile generator is a DISTANCE TO GO analog signal produced by the digital-to-analog converter 505. As the operation of this circuit is explained we will see that the digital-to-analog converter 505 is fed a digital signal which is related to the real time distance from the vehicle to the stopping point. As the vehicle proceeds towards the stopping point this digital input is continually decremented such that the analog output of the digital-to-analog converter 505 is at all times a quantity representative of the actual distance to go from the vehicle to the stopping point. A second output of stopping profile generator 109 is an initializing signal from the flip-flop 503 which is provided to the velocity command circuit 102 shown in FIG. 1 and shown in more detail in FIG. 4.

Before describing the system in some detail, it will be helpful to gain an understanding of the overall philosophy of the system.

The stored profile lengths, that is, the approximate stopping distance required of the vehicle are stored in matrix 543. As has been explained above there are two different stopping distances, one for the M/P stopping profile and the other for the L/S stopping profile. Depending upon which is selected, the matrix 543 sets a ten-stage counter composed of flip-flops 508–517 via lines 2–11. The 8 most significant bits of this counter feed the 8-stage digital-to-analog converter 505. The state of the counter is sensed on leads 22–31. Some of these leads are connected directly to gate 542 for sensing purposes and others are fed through expandor 544 to gate 542. In any event, the output of gate 542 is a $\overline{\text{COUNTER ZERO}}$ signal, that is, it is high when the counter contains a non-zero count. The complement of this signal, COUNTER ZERO, also forms an input to the circuit of FIG. 4.

After the initial stopping distance has been set into the 10-stage counter, the counter is decremented one count for each of the compensated distance pulses through gates 506, 539 and 537.

In order to insure that all code changes have occurred and the signals have stabilized, the period of time required for the first foot and onehalf of travel after receipt of the stopping command is given special treatment. The receipt of a stopping command is registered by the presence of an F4 signal. A 6-stage counter made up of flip-flops 545–550 counts an initial-foot and one-half of vehicle travel before enabling gates 501 and 502 to select one or the other of the stored profile lengths in matrix 543 for setting the 10-stage counter.

To ensure proper operation of the stopping profile generator the output of digital-to-analog converter 505 must represent the distance between the vehicle and the stopping point. One essential requirement necessary to ensure this operation is that the 10-stage counter prior to being set to one of the stored profile lengths be in its zero state. To assure this, the circuit of FIG. 5 provides a means of zeroing this counter whenever a stopping operation is not in progress. Gate 507 receives a $\overline{\text{PM}}$ on one input and the 33 kilohertz clock signal on the other input. The $\overline{\text{PM}}$ signal is produced in response to the absence of F4 by flip-flop 221 (see FIG. 2). From the table on page 5 it will be apparent that the absence of F4 occurs only when a stopping operation has not been requested. Therefore, when $\overline{\text{PM}}$ is high gate 507 will produce a continuous series of output pulses in response to the 33 kilohertz clock input. These count pulses are provided as one input to gate 539. A second input to gate 539 comes from gate 542 and is the $\overline{\text{COUNTER ZERO}}$ signal. When the counter contains a non-zero count this signal will, of course, be high. The third input to gate 539 is provided by the output of gate 551. The inputs to gate 551 are provided by flip-flops 549 and 550 of the foot and a half counter. We will see as this description proceeds that on the completion of its counting operation, this counter is reset and therefore the output of gate 551 will be high. The only remaining input to gate 539 is the output from flip-flop 541. Flip-flop 541 responds to the zero output of flip-flop 503 which, as we shall see, as the description proceeds, is high prior to initiating a stopping operation. Therefore, the one output of flip-flop 541 will be high. Thus, all of the inputs to gate 539 will be high except for the input on which the count pulses are applied. As a result, the output of gate 539 and the output of gate 537 will follow the count pulses. Gate 537 provides the input to step the 10-stage down counter.

As a result, the count pulses produced by gate 507 are translated into decrementing pulses produced by gate 537 so long as the counter does not contain a zero count and so long as no stopping operation is being requested. This operation will continue until the counter counts down to zero. At that point the $\overline{\text{COUNTER ZERO}}$ signal goes low thereby disabling gate 539 from passing any further count pulses. Thus, the 10-stage counter made up of flip-flops 508–517 is decremented to zero prior to the receipt of a stopping signal.

When a stop is requested the first manifestation is the decoding of the F4 signal and the production at flip-flop 221 (in FIG. 2) of the PM signal. Receipt of the PM signal at each of the flip-flops making up the foot and a half counter (545–550) resets each of these to zero and it also sets flip-flop 503 so that its one output is high. This enables gate 504 to pass $\overline{\text{CDP}}$ pulses to increment the foot and a half counter. When the foot and a half counter receives a count equivalent to 48 the one output of flip-flops 549 and 550 will both be high causing gate 551 to be low and gate 552 to be high. This output of gate 552 enables both gates 501 and 502. At any time subsequent to the 48th count, either gate 501 or 502 will produce an output dependent upon whether the stopping profile requested is M/P or L/S. Depending upon which of these stopping requests is received, one of the two values stored in matrix 543 will set the 10-stage counter 508–517. As we will see below, some additional counts are received in the 1½ foot counter to allow for the 10-stage counter to set up. As a result, the values stored in the matrix 543 are actually 1½ feet less than the stopping distance for the respective stop. That is, if the total distance for an M/P stop is D feet, then the number stored in matrix 543 with respect to the M/P command would be D - 1½ feet. In a like manner, the distance stored in matrix 543 with respect to the L/S command will also be 1½ foot less than the actual stopping distance.

Although the counter at a count of 48 causes the 10-stage counter to be set the 1½ foot counter continues to count beyond 48. Sixteen counts beyond the count of 48 the counter will have cycled completely around back to zero again which will result in a high output of gate 551 and a low output of gate 552. At this point flip-flop 503 is switched so that its zero output is high. At the same time, the high output of gate 551 partially enables gate 539. The high zero output of flip-flop 503 sets flip-flop 541 to provide another partially enabling signal to gate 539. The $\overline{\text{COUNTER ZERO}}$ signal is now high since this counter, having been set to the respective length stored in matrix 543, is now not registering a count of zero. Finally, the presence of the PM and CDP signals as the input to gate 506 now allows the last input of gate 539 to alternate for each of the CDP pulses. These pulses then begin decrementing the values stored in the 10-stage counter. Each of the CDP pulses decrements the value stored in the 10-stage counter by the one unit. Since each of these pulses is representative of the vehicle having traveled one unit of distance and since the number originally stored in the counter was representative of the number of units of distance required to stop the vehicle the digital value remaining in the counter at any period of time during a stopping operation is representative of the number of distance units between the vehicle and the desired stopping point. The digital-to-analog converter 505 produces an analog voltage which is thus directly proportional to the distance from the vehicle to the stopping point.

Now that we have identified each of the inputs to the detailed schematic shown in FIG. 4 we can discuss the manner in which that circuit operates.

Before discussing the operation of the circuit of FIG. 4 in detail we will identify the manner in which it corresponds to the block diagram in FIG. 1. The velocity command circuit 102 in FIG. 1 is required to select between two possible provisional velocity commands, one from the analog speed selection circuit 101 and the second from the stopping profile generator 109. That apparatus corresponds to operational amplifiers 401, 407, and 410 and their associated components. The rate circuit 106 which receives an analog actual velocity signal and produces an analog rate of change in velocity signal comprises operational amplifiers 412, 413, 414, and 415 and their associated components. The summing amplifier 107 corresponds to operational amplifier 416. The summing amplifier 104 corresponds to operational amplifier 417 and its associated components. The limiting circuit 103 corresponds to operational amplifiers 418, 419, and 422 and thier associated components. The summing amplifier 105 corresponds to operational amplifier 425. The jerk limit circuit 112 corresponds to operational amplifiers 426, 427 and 428 and 431 and their associated components. The air spring pressure input to the jerk limit circuit 112 is provided at terminal 440 to operational amplifiers 437 and 438. The accelerometer signal is provided at terminal 441 and is processed through a direction relay and a low pass filter comprising operational amplifier 447 and its associated components. The integrator corresponds to operational amplifier 434.

To further aid in the understanding of this operation, we will now specify the source of the various input signals. The input to operational amplifier 401, the ANALOG SPEED COMMAND is provided by the output of operational amplifier 301 (FIG. 3). The INITIAL input to gate 408 is provided by the INITIAL output of flip-flop 503 (FIG. 5). The DISTANCE TO GO input signal to operational amplifier 407 is provided by the output of the digital-to-analog converter 505 (FIG. 5). The COUNTER ZERO input to amplifier 411 is provided by the output of inverter 540 (FIG. 5). The signal ACTUAL VELOCITY provided to amplifiers 412 and 417 is produced from the output of low pass filter 701 (FIG. 7). The signal $\overline{\text{COUNTER ZERO}}$ applied to gate 450 is provided by the output of gate 542 (FIG. 5).

In the absence of a stop command the signal INITIAL is high, providing a low output from gate 408 clamping the input to amplifier 407 at a low level. This results in a high output of amplifier 407. Since the combination of diodes 402 and 403 selects the lower of the two outputs of amplifiers 401 and 407, the high output of amplifier 407 will not enter into the operation of the remainder of the circuit. It is only when the signal INITIAL is low that the DISTANCE TO GO and COUNTER ZERO signals have any effect on the circuitry of FIG. 4. The analog speed command voltage provided to amplifier 401 will then be provided as one input to amplifier 417 through amplifier 410. The signal ACTUAL VELOCITY is provided to amplifier 417 so that it may take the difference between the analog speed command and the ACTUAL VELOCITY signal. A third input to amplifier 417 is provided from amplifier 416.

One of the inputs to amplifier 416 is the velocity rate of change provided by amplifier 414. The velocity rate of change signals produced by amplifiers 412 through 415 which comprises a rate circuit. A second input to amplifier 416 is the acceleration sensed by the vehicle's accelerometer.

The accelerometer itself is connected to terminal 441. Although many accelerometers could be used a suitable accelerometer is available from Columbia Research Laboratories designated Model SA-107. Since this accelerometer is direction sensitive and since the vehicle on which this control system is to be used is capable of movement in two opposite directions, the accelerometer must be connected in the control circuit in accordance with the direction of movement of the vehicle. To this end, a direction relay is provided which has contacts 445 and 446, depending upon the direction of travel of the vehicle. The accelerometer signal is provided to an amplifier 442 which is connected to contact 446. The output of amplifier 442 is provided to amplifier 444. The output of amplifier 444 is provided to relay contact 445. The outputs of the two amplifiers are opposite in sense and therefore relay contact 445 corresponds to one direction of movement of the vehicle and relay contact 446 corresponds to the reverse direction. Therefore, depending upon the direction of movement of the vehicle one or the other of the relay contacts 445 and 446 will properly connect the accelerometer signal in accordance with the direction of movement of the vehicle. The accelerometer signal is passed through a low pass filter associated with amplifier 447 in order to provide a smooth accelerometer signal. This accelerometer signal is provided to amplifier 425 in addition to amplifier 416.

The output of amplifier 416 which is the difference between the time rate of change of velocity and the acceleration of the vehicle is thus a signal proportional to the grade over which the vehicle is traveling.

Amplifier 417 sums the analog speed command signal, the actual velocity signal and the grade signal to produce a velocity error signal which is compensated in respect of the terrain of the vehicle. This velocity error signal is provided as one input to amplifier 425. Amplifiers 419 and 422 and their associated components form a limiting circuit for limiting the amount of velocity error which is provided as an input to amplifier 425. This is the acceleration limiting circuit which is designed to limit the acceleration to which the vehicle is subjected within predetermined limits. Those limits are established by the positive and negative sources of supply voltage connected by these amplifiers. If the total acceleration force exerted on the vehicle, that is, the grade acceleration and the rate of change of velocity acceleration is below the acceleration force limit the grade compensation included in the velocity error signal is cancelled out by the operation of amplifier 425. That is, the grade signal which is added in at amplifier 417 is subtracted out at amplifier 425. The result, at the output of amplifier 425 is a signal indicative of the increased tractive effort required of the vehicle in order to reduce the difference between the command speed and actual speed to zero.

Before that signal is utilized in the propulsion and braking control of the vehicle, it is modified, if necessary, by the jerk limiting circuitry comprising amplifiers 426 and 427. Jerk is the time rate of change of acceleration and is therefore equal to the time rate of change of tractive effort multiplied by the inverse of the vehicle mass. Since it is the time rate of change of tractive effort which is being controlled that must be limited to a value which is proportional to vehicle mass so that the jerk is limited to a constant value. Therefore, the limiting circuitry, amplifiers 428 and 431, is provided a limiting signal which is proportional to vehicle load. The vehicles may be air supported and therefore the air spring pressure is proportional to load. Of course, other means may be used to sense vehicle loading in this circuitry. Therefore, a signal proportional to the air spring pressure is applied to terminal 440 which supplies the limiting value for the limiter comprising amplifiers 428 and 431. In this manner the tractive effort called for will not cause the predetermined jerk limits to be exceeded. The output of amplifier 427 is a signal proportional to the allowable and necessary rate of change of tractive effort required to reduce the velocity error to zero. The signal is integrated by operational amplifier 434 to provide a signal proportional to the change in tractive effort required to reduce the velocity errror to zero. Operational amplifier 434 is, however, inhibited from operation when relay contact 436 is closed. This contact is closed only when the vehicle is not running; when thhe vehicle begins movement, relay contact 436 opens allowing integrator 434 to operate.

Now that the mode of operation of this circuit has been explained under general running conditions, the manner in which it operates in a stopping profile will be explained.

The first manifestation of a stopping command is the receipt of an F4 signal which, as has been discussed above, produces the PM signal. This in turn generates a low INITIAL signal in flip-flop 503. This produces a high output from gate 408 enabling amplifier 407 to follow its other input signals. Amplifier 407 receives a COUNTER ZERO signal from amplifier 411 and a DISTANCE TO GO signal from digital-to-analog converter 505. Until the counter comprising flip-flops 508–517 is set the output of amplifier 411 will keep the output of amplifier 407 high. It will be recalled that the counter comprising flip-flops 508–515 is not set until the decoding of one of the signals M/P or L/S. Until that time, the circuit of FIG. 4 operates as though no stopping command had been received, that is, it operates in response to the velocity command produced by amplifier 401.

However, when the counter does receive a non-zero count, a number of actions take place. In the first place, the COUNTER ZERO input to gate 450 will go high producing a low output. Transistor 449 which has previously been on due to the high output of gate 450 will now cease conducting. This will interupt the path of current flow through the PR relay opening contacts PR-1 which had previously been closed. This is merely a scale changing device to change the velocity rate scale factor in the profile mode as compared to its factor in the non-profile mode.

The COUNTER ZERO signal going low when the counter is loaded results in the output of amplifier 411 going high enabling amplifier 407 to follow its other input which is the DISTANCE TO GO signal. Once the counter is loaded the digital-to-analog converter 505 presents a non-zero input to amplifier 407. However, this DISTANCE TO GO signal may not be the one selected for transmission through amplifier 410. Reference to FIG. 3 shows that a decoded signal of M/P, M/L, or L/S are all equivalent to a low speed command for the vehicle. The decoding of any of these signals causes relay 311 to be energized inserting resistor 317 into the input circuit of amplifier 301 which corresponds to a low speed command. In the initial phases of stopping profile, this velocity command may well be less than the effect of the DISTANCE TO GO signal. As has been explained before, the diodes 402 and 403 cause the lower of the signals from amplifiers 401 and 407 to be selected as the velocity command. If that is the case, however, as the DISTANCE TO GO decreases, control will be shifted from the output of amplifier 401 to the output of amplifier 407. As a result, the vehicle velocity is continually decreased proportional to the real time distance between the vehicle and its chosen stopping point.

In all other respects, the circuit operates identically, whether under control of the profile generator or under the control of some other analog speed command. Just as in the case with a high medium or low speed command, the vehicle is stopped with due respect to acceleration and jerk limits.

Figure 8:
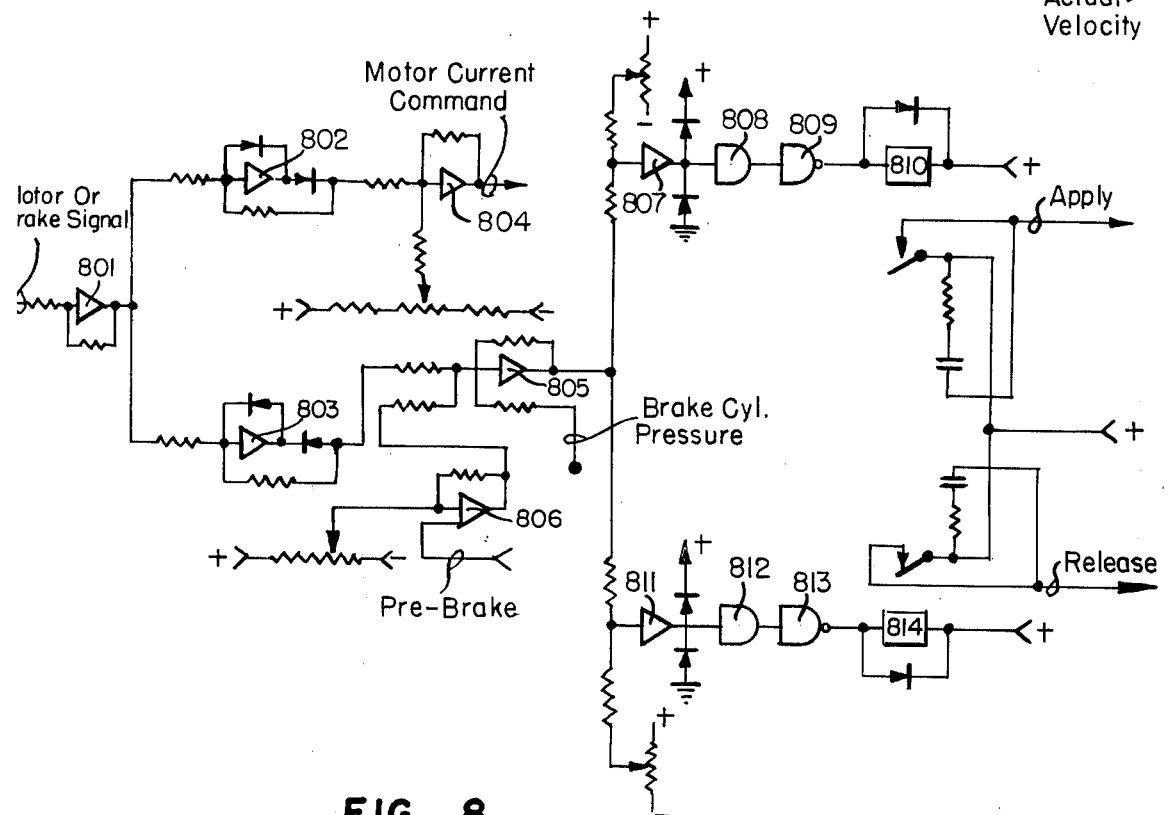
FIG. 8 is a schematic of a propulsion and brake signal control circuit.

Now that the manner in which the vehicle response to the various speed and stopping commands has been explained up to the point of generating a motor or brake signal we can discuss the schematic of FIG. 8 and the manner in which this signal actually operates the propulsion or braking apparatus of the vehicle. The signal, which is representative of a change in tractive or braking effort, is communicated from the output of amplifier 434 to the input of amplifier 801.

The signal applied to amplifier 801 is indicative of the change in tractive effort required, where the term "tractive effort" is used in its generic sense. The sense of the signal will be indicative of whether or not the control is applicable to the propulsion or the braking apparatus of the vehicle. Amplifiers 802 and 803 couple respectively the propulsion and braking commands. The diodes associated with each of these amplifiers perform the selecting operation, that is, the diodes associated with amplifier 802 select those signals whose sense indicates they are applicable to the control of the vehicle propulsion equipment. Of course, a signal of the opposite sense would not pass these diodes and therefore would have no effect on the vehicle propulsion equipment. Correspondingly, the diodes associated with the amplifier 803 select those signals whose sense indicates they are for brake control purposes only. It has been found useful, when a braking operation is to be initiated, to precharge the brake apparatus of the vehicle so that the vehicle can respond rapidly to a request for braking. To this end, diode 435 (in FIG. 4) couples a pre-brake signal as one input of amplifier 806. The resistors of the amplifier 806 are chosen such that, when applied, the prebrake signal increased brake pressure by a small amount to minimize the braking lag in the transition from propulsion to braking.

When a braking command is necessitated an input is presented to amplifier 805. This signal is compared with a signal representative of brake cylinder pressure to determine whether or not any increase or decrease in the braking is required. If the braking demand exceeds the braking that is taking place, the output of amplifier 805 will be positive and the signal, after passing the amplifier 807, buffer 808, and inverter 809 will result in a high output of inverter 809 causing brake apply magnet valve 810 to become deenergized. This, as is conventional in pneumatic braking systems, allows the brake cylinder pressure to increase the braking applied to the vehicle. When the increasing brake pressure equals the braking demand, the output of amplifier 805 will go to zero which will cause relay 810 to again become energized to stop the change in brake cylinder pressure and maintain the braking level which had been achieved.

If at any time the brake signal demand presented to amplifier 805 decreases below the actual brake cylinder pressure then the braking effort aboard the vehicle is above what is required by the control system. This results in a negative output signal from amplifier 805 which, after passing through amplifiers 811, buffer 812, and inverter 813 will result in a low output signal which will cause relay 814, the brake release magnet valve to become energized. Again, as is conventional in the pneumatic braking art, this will cause the brake cylinder pressure to decrease. When the brake cylinder pressure has decreased to the point where it is equal to the braking demand and the output of amplifier 805 will go to zero which will deenergize the relay 814 which will stop the change in brake cylinder pressure. Thus, the braking effort which has then been achieved will be maintained until there is some change in the signal presented to amplifier 805 by amplifier 803.

In the absence of a request for braking, that is, in the absence of a signal that can pass amplifier 803, relay 814 is deenergized by reason of high output of inverter 813. At the same time, however, relay 810 is energized by reason of the low output of inverter 809. This action is accomplished when the output of amplifier 805 is zero by reason of the biasing voltages applied to amplifiers 807 and 811.

What is claimed is:

1. Vehicle control apparatus for accurately stopping a self-propelled vehicle within a predetermined distance at a predetermined point after receipt of a stop command by the automatic control of propulsion and braking apparatus on said vehicle including,
   speed control means to control said vehicle to a velocity equal to a command velocity,
   means for receiving said stop command,
   digital registering means,
   means for storing, responsive to receipt of said stop command for storing in said registering means a quantity linerally related to said predetermined distance,
   signal producing means responsive to vehicle wheel rotation for producing a signal related to wheel rotation,
   decrementing means connected to said signal producing means for decrementing the quantity stored in said digital registering means in response to said signal, and
   means connected to said registering means for generating a command velocity proportional to the value stored in said registering means.

2. The apparatus of claim 1 wherein said means for receiving said stop command includes means for receiving and decoding a plurality of different stop commands,
   said means for storing selecting a quantity related to a received decoded stop command for storage in said registering means.

3. The apparatus of claim 1 wherein said signal producing means includes,
   means for producing a pulse signal for each rotation of a vehicle wheel.

4. The apparatus of claim 3 in which said signal producing means further includes compensation means connected to said pulse producing means and producing a compensated pulse signal, switch means for conditioning said compensation means to delete selected pulses from said signal to thereby provide said decrementing means with a compensated pulse signal.

5. The apparatus of claim 1 in which a digital to analog converter is included in said means for generating a command velocity.

6. The apparatus of claim 1 in which said means for receiving said stop command generates a provisional stop command and a stop command subsequent to said provisional stop command,
   said means for storing providing a quantity representative of said predetermined distance $-\Delta$ wherein $\Delta$ is a length over which said vehicle may travel between production of said provisional stop command and said stop command,
   a counter,
   means responsive to said provisional stop command for enabling said counter to count in response to said signal,
   means responsive to said counter reaching a predetermined count for enabling said storing means to store said quantity in said digital registering means, and
   means responsive to said counter counting to a second predetermined count for enabling said decrementing means.

7. The apparatus of claim 1 further including acceleration limiting means, including within said speed control means for limiting the acceleration of said vehicle to a predetermined maximum.

8. The apparatus of claim 1 further including jerk limiting means to limit the jerk of the vehicle to a predetermined maximum.

9. The apparatus of claim 8 in which said jerk limiting apparatus senses the vehicle loading and controls the rate of change of tractive effort to a value proportional to vehicle load.

10. Position control apparatus to accurately stop a self-propelled vehicle a predetermined distance from a predetermined location by automatic control of propulsion and braking apparatus in response to a stop command including,
    speed control means to control said vehicle to a velocity equal to a command velocity,
    means for receiving said stop command,
    means responsive to said last named means for registering said predetermined distance,
    signal producing means responsive to vehicle wheel rotation for producing a signal related to wheel rotation,
    decrementing means connected to said signal producing means for decrementing the value stored in said means for registering in response to said signal,
    means connected to said means for receiving for generating a provisional command velocity equal to a predetermined low speed in response to receipt of said stop command,
    further means for generating a further provisional command velocity in response to receipt of said stop command, said further means being connected to said registering means and generating a further provisional command velocity which is proportional to the value stored in said registering means,
    selection means connected to both said means for generating and to said further means for generating for selecting the lower of said provisional command velocity and said further provisional command velocity, the output of said selection means supplying the selected command velocity to said speed control means to control said vehicle to stop after traveling said predetermined distance.

11. The apparatus of claim 10 in which said means for receiving said stop command can receive and identify two different stop commands, the one command being effective to stop said vehicle in one predetermined distance and another stop command being effective to stop said vehicle in another predetermined distance, said means for registering responsive to said means for receiving to register said one predetermined distance or said another predetermined distance in response to receipt of said one or said another of said stop commands.

12. Speed control apparatus to control the propulsion and braking of a self-propelled vehicle to achieve a command velocity within acceleration limits including, command velocity signal generating means,
means for generating a signal prorportional to actual velocity and
means for controlling the propulsion and braking of said vehicle to equalize said command velocity signal and said actual velocity signal,
said last named means including acceleration sensing means for sensing actual vehicle acceleration and means for comparing said sensed acceleration within said acceleration limits, said means for comparing being effective to limit vehicle acceleration within said acceleration limits, and jerk limiting means for limiting vehicle jerk in light of vehicle load,
said jerk limiting means including an amplifier and a limiting circuit to limit the input to said amplifier between variable predetermined limits,
said limiting circuit establishing said limits in accordance with the input to said limiting circuit,
and means connecting a signal proportional to vehicle load to said limiting circuit input.

13. The apparatus of claim 12 which further includes, means for sensing a vehicle load and producing a signal proportional to vehicle load.

14. The apparatus of claim 13 which includes integrating means, connected to said amplifier, to provide a signal proportional to tractive effort, said integrating means being connected to propulsion and braking apparatus on board said vehicle.

* * * * *